(12) United States Patent
Harper (10) Patent No.: US 9,219,824 B1
(45) Date of Patent: Dec. 22, 2015

(54) EXCHANGE SERVICE FOR WIRELESS COMMUNICATION PRICING ACCESSIBLE BY WALLET APPLICATIONS

(71) Applicant: RFCO LLC, Madeira Beach, FL (US)

(72) Inventor: Anthony Harper, Madeira Beach, FL (US)

(73) Assignee: RFCO LLC, Madeira Beach, FL (US)

( * ) Notice: Subject to any disclaimer, the term of this patent is extended or adjusted under 35 U.S.C. 154(b) by 0 days.

(21) Appl. No.: 14/640,922

(22) Filed: Mar. 6, 2015

(51) Int. Cl.
| | |
|---|---|
| *H04M 11/00* | (2006.01) |
| *G06Q 30/00* | (2012.01) |
| *H04M 15/00* | (2006.01) |
| *G06Q 20/36* | (2012.01) |
| *G06Q 20/38* | (2012.01) |

(52) U.S. Cl.
CPC .............. *H04M 15/67* (2013.01); *G06Q 20/36* (2013.01); *G06Q 20/3829* (2013.01); *H04M 15/31* (2013.01); *H04M 15/48* (2013.01)

(58) Field of Classification Search
CPC .............. H04W 4/24; H04M 2215/32; G06Q 30/0226; G06Q 30/02
USPC .......... 455/405–408; 705/14.27–14.29, 14.3, 705/14.33, 39
See application file for complete search history.

(56) References Cited

U.S. PATENT DOCUMENTS

| | | | |
|---|---|---|---|
| 5,974,308 A | 10/1999 | Vedel | 455/407 |
| 7,203,478 B2 | 4/2007 | Benco et al. | 455/406 |
| 2013/0218657 A1* | 8/2013 | Salmon et al. | 705/14.29 |
| 2014/0106706 A1 | 4/2014 | Tan et al. | 455/408 |
| 2014/0106728 A1 | 4/2014 | Aboulhosn et al. | 455/418 |
| 2014/0143073 A1* | 5/2014 | Doris-Down | 705/16 |
| 2014/0222563 A1* | 8/2014 | Ramachandran et al. | 705/14.53 |
| 2014/0258110 A1* | 9/2014 | Davis et al. | 705/41 |
| 2014/0370848 A1* | 12/2014 | Petcavich | 455/406 |
| 2015/0046337 A1* | 2/2015 | Hu et al. | 705/65 |

\* cited by examiner

*Primary Examiner* — Dung Hong
(74) *Attorney, Agent, or Firm* — Pillsbury Winthrop Shaw Pittman LLP (57) ABSTRACT

A system and method may provide an exchange service for providing the price of wireless minutes to wallet applications and other client applications. The system may obtain pricing information for the wireless minutes and provide the pricing information to a wallet application. The pricing information may be provided through a rate server that subscribed to receive the pricing information. The rate server typically also provides exchange rates for currencies for use at wallet applications that are communicably coupled to the rate server. By providing the pricing information to wallet applications, wireless service providers may variably price their wireless services. End users may be able to obtain real-time prices of the wireless services and purchase such services directly using payment accounts associated with a wallet application. For example, a Bitcoin wallet may be used to obtain real-time prices of the wireless services and purchase such services using Bitcoins.

16 Claims, 8 Drawing Sheets

EXCHANGE SERVICE FOR WIRELESS COMMUNICATION PRICING ACCESSIBLE BY WALLET APPLICATIONS

FIELD OF THE INVENTION

The invention relates to an exchange service for providing the price of wireless communication units and other commodities accessible by wallet applications and other client applications.

BACKGROUND OF THE INVENTION

Wallet applications for mobile devices have grown in popularity due to their convenience of use and improved security features. Wallet applications generally are pre-associated with a payment account used to pay for purchases. For instance, Softcard™ from American Express® is associated with a credit card that is charged whenever the Softcard™ wallet application is used to make a purchase. Some wallet applications use digital currencies, such as Bitcoin, to fund purchases. Many wallet applications (in particular those using digital currencies) provide exchange rates. For example, Bitcoin wallet applications typically provide exchange rates to convert Bitcoins into fiat or other currencies.

Although convenient to make purchases at retail locations that accept wallet application payments, purchasing commodities is still cumbersome. For example, purchasing wireless minutes (and other increments of wireless services) from a wireless service provider using a wallet application may be impractical. This is because, from the end user's point of view, the rates (i.e., prices) for the wireless minutes are unknown when contemplating activating or adding increments of wireless services. These and other drawbacks exist with conventional wallet applications and wireless minute purchases.

SUMMARY OF THE INVENTION

The invention addressing these and other drawbacks relates to a system and method for providing an exchange service that provides price information for wireless communication units and other commodities. The price information may include a price for a given wireless communication unit. The price may be denominated in one or more currencies (e.g., a digital currency, a fiat currency, and/or other type of currency) according to particular needs.

The price information may be provided (indirectly through rate servers and/or directly) to a wallet application executing on a client device. The price information may be provided on-demand (e.g., the wallet application may request the price information each time the wallet application is opened, when a network connection is available, based on an explicit request from an end-user operating the client device, etc.). Alternatively or additionally, the price information may be provided at regular intervals and/or upon occurrence of a publication triggering event (e.g., when updated price information is available). In this manner, the wallet application may obtain (either directly from the system or through rate servers) real-time or near-real-time prices for wireless communication units or other commodities, as well as facilitate purchases of such units or commodities.

A wireless communication unit may be used by a wireless service provider as a way to monitor usage of a wireless service. A wireless communication unit may be expressed as an increment of time (e.g., number of minutes or other increment of time), an increment of data (e.g., megabytes (Mb) of data), and/or other unit that may be used to monitor usage of a wireless service. A wireless service may include, without limitation, a satellite-based communication service, a terrestrial-based communication service (e.g., cellular service), and/or other communication service that may charge a fee for the use of wireless communication units. Although described herein as "wireless communication units" and "wireless service," other types of communication services (e.g., landline, Public Switched Telephone Network (PSTN), etc.) may be used as well.

Wireless communication units will be used as examples throughout for ease of illustration and not limitation. It will be apparent, however, that the system may be used to provide an exchange for providing price or other exchange information for other commodities (e.g., rewards such as airline miles, goods, services, financial securities, etc.) based on the disclosure herein as well. Furthermore, examples of commodities will be described with respect to wireless minutes for convenience and not limitation. Other wireless communication units and commodities may be used as well.

To facilitate these and other functions, the system may include a computer system that aggregates pricing information from one or more pricing providers. The pricing providers may include, without limitation, a wireless service provider, a rewards (e.g., airline miles) provider, a commodities producer or exchange, a financial services provider, and/or other entities that may provide pricing information for a good or service.

The computer system may store the price information in a pricing database in association with the type of commodity to which the price information pertains, a provider of the commodity, and/or other information that may be used to retrieve the price information for a given commodity or provider of the commodity.

The computer system may provide the price information to rate servers, which may then provide the price information (along with their own exchange rate information) to a wallet application. For instance, a particular rate server may subscribe to receive the price information (e.g., the price for wireless minutes) provided by the computer system. A wallet application that receives exchange rates from the particular rate server may also receive the price for wireless minutes. The particular wallet application will therefore have access to and display the price for wireless minutes.

Using the system, a wireless service provider may introduce variably priced wireless services, including limited time promotions (e.g., discounts), that may be purchased using a wallet application (which may be executing on the device that uses the wireless services). For instance, a wireless service provider may encode identification information into a Quick Response (QR) code or other machine readable code that is printed on a SIM card or on packaging of the SIM card. Other devices (other than a SIM card) used to identify a client device that accesses wireless services may be used as well. Furthermore, other ways to convey the identification information may be used as well.

The client device (which may be programmed with a wallet application) may display the price of the wireless minutes, which may have been obtained from a rate server. The client device may obtain the identification information from the QR code, identify the wireless service based on the identification information, and initiate a purchase of the wireless minutes using a payment account associated with the wallet application. As such, an end user may obtain real-time or near-real-time pricing for wireless minutes and purchase the wireless minutes using a wallet application. In some instances, a given wallet application may use a particular currency. The wallet application may automatically convert the price of the wireless minutes in to the particular currency, as necessary, based on the price information ultimately provided by the computer system.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION OF THE INVENTION

The invention described herein relates to a system and method for an exchange service that provides price information for wireless communication units and other commodities.

Exemplary System Architecture

Figure 1:
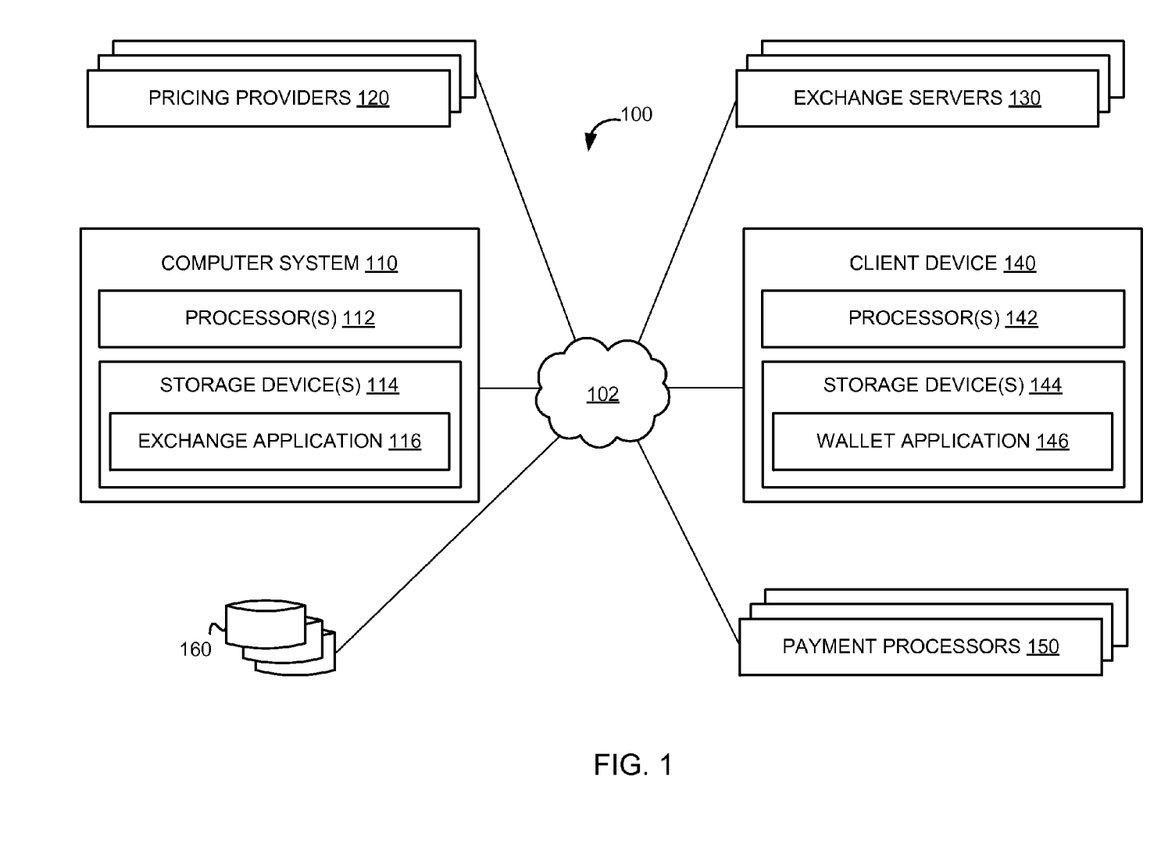
FIG. 1 illustrates an exemplary system for an exchange service that provides price information for wireless communication units and other commodities and facilitating the purchase through wallet applications, according to an implementation of the invention.

FIG. 1 illustrates an exemplary system 100 for an exchange service that provides price information for wireless communication units and other commodities and facilitating the purchase through wallet applications, according to an implementation of the invention.

System 100 may include one or more computer systems 110, one or more pricing providers 120, one or more rate servers 130, one or more client devices 140, one or more payment processors 150, one or more databases 160, and/or other components.

Computer System 110

Computer system 110 may be implemented as a server computing device, a personal computer (e.g., a desktop computer, a laptop computer, etc.), a smartphone, a tablet computing device, and/or other device that can be used to provide pricing for wireless communication units.

Computer system 110 may include one or more processors 112 (also interchangeably referred to herein as processors 112, processor(s) 112, or processor 112 for convenience), one or more storage devices 114 (which may store an exchange application 116), and/or other components. Processors 112 may be programmed by one or more computer program instructions. For example, processors 112 may be programmed by exchange application 116 and/or other instructions.

It should be noted that the functions of computer system 110 (described in more detail herein) may be provided as a standalone service to various entities and/or may be integrated within the various entities' systems. For example, computer system 110 may be a standalone computer system or be integrated into a pricing provider's computer system, a rate server's computer system, and/or other entity's computer systems.

Pricing Providers 120

A pricing provider 120 may include an entity that provides price information for a commodity. For example, and without limitation, a pricing provider 120 may include a telecommunication company (e.g., a wireless service provider), a rewards provider (e.g., an airline miles provider), a commodity producer, financial securities brokers/managers, and/or others that provide goods or services at a price or exchange rate that generally (although not necessarily) varies. Thus, a given pricing provider may use the system to expose their prices to a wallet application, as well as facilitate the sale of a commodity through the wallet application.

Rate Servers 130

A rate server 130 may include an entity that provides exchange rates for currencies it deems are relevant to its business. For example, various credit card companies and other financial institutions may offer their own rate servers that provide relevant rates to their own wallet applications. Some rate servers 130 provide centralized currency exchanges used by financial institutions.

Client Devices 140

A client device 140 may be implemented as a personal computer (e.g., a desktop computer, a laptop computer, etc.), a smartphone, a tablet computing device, and/or other device that can be used to pricing for wireless communication units or other commodity and facilitate the purchase of such commodity.

Client device 140 may include one or more processors 142 (also interchangeably referred to herein as processors 142, processor(s) 142, or processor 142 for convenience), one or more storage devices 144 (which may store a wallet application 146), and/or other components. Processors 142 may be programmed by one or more computer program instructions. For example, processors 142 may be programmed by wallet application 146 and/or other instructions.

Payment Processors 150

Payment processors 150 may include digital currency transaction loggers (e.g., Bitcoin transaction processors/miners), conventional credit card payment processors, electronic funds transfer processors, and/or other payment processors that can transfer currency from a sender (or payer) account to a recipient (or payee) account.

Databases 160

The various databases 160 described herein may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database may comprise one or more such databases that reside in one or more physical devices and in one or more physical locations. The database may store a plurality of types of data and/or files and associated data or file descriptions, administrative information, or any other data.

Although illustrated in FIG. 1 as a single component, computer system 110 may include a plurality of individual components (e.g., computer devices) each programmed with at least some of the functions described herein. In this manner, some components of computer system 110 may perform some functions while other components may perform other functions, as would be appreciated.

The one or more processors 112, 142 may each include one or more physical processors that are programmed by computer program instructions. The various instructions described herein are exemplary only. Other configurations and numbers of instructions may be used, so long as the processor(s) 112, 142 are programmed to perform the functions described herein.

Furthermore, it should be appreciated that although the various instructions are illustrated in FIG. 1 as being co-located within a single processing unit, in implementations in which processor(s) 112, 142 each includes multiple processing units, one or more instructions may be executed remotely from the other instructions.

The description of the functionality provided by the different instructions described herein is for illustrative purposes, and is not intended to be limiting, as any of instructions may provide more or less functionality than is described. For example, one or more of the instructions may be eliminated, and some or all of its functionality may be provided by other ones of the instructions. As another example, processor(s) 112, 142 may each be programmed by one or more additional instructions that may perform some or all of the functionality attributed herein to one of the instructions.

The various instructions described herein may be stored in a storage device 114, 154, which may comprise random access memory (RAM), read only memory (ROM), and/or other memory. The storage device may store the computer program instructions (e.g., the aforementioned instructions) to be executed by processor 112, 142 as well as data that may be manipulated by processor 112, 142. The storage device may comprise floppy disks, hard disks, optical disks, tapes, or other storage media for storing computer-executable instructions and/or data.

The various components illustrated in FIG. 1 may be coupled to at least one other component via a network 102, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In FIG. 1, as well as in other drawing Figures, different numbers of entities than those depicted may be used. Furthermore, according to various implementations, the components described herein may be implemented in hardware and/or software that configure hardware.

Delivery/Publication of Pricing Information

Figure 2:
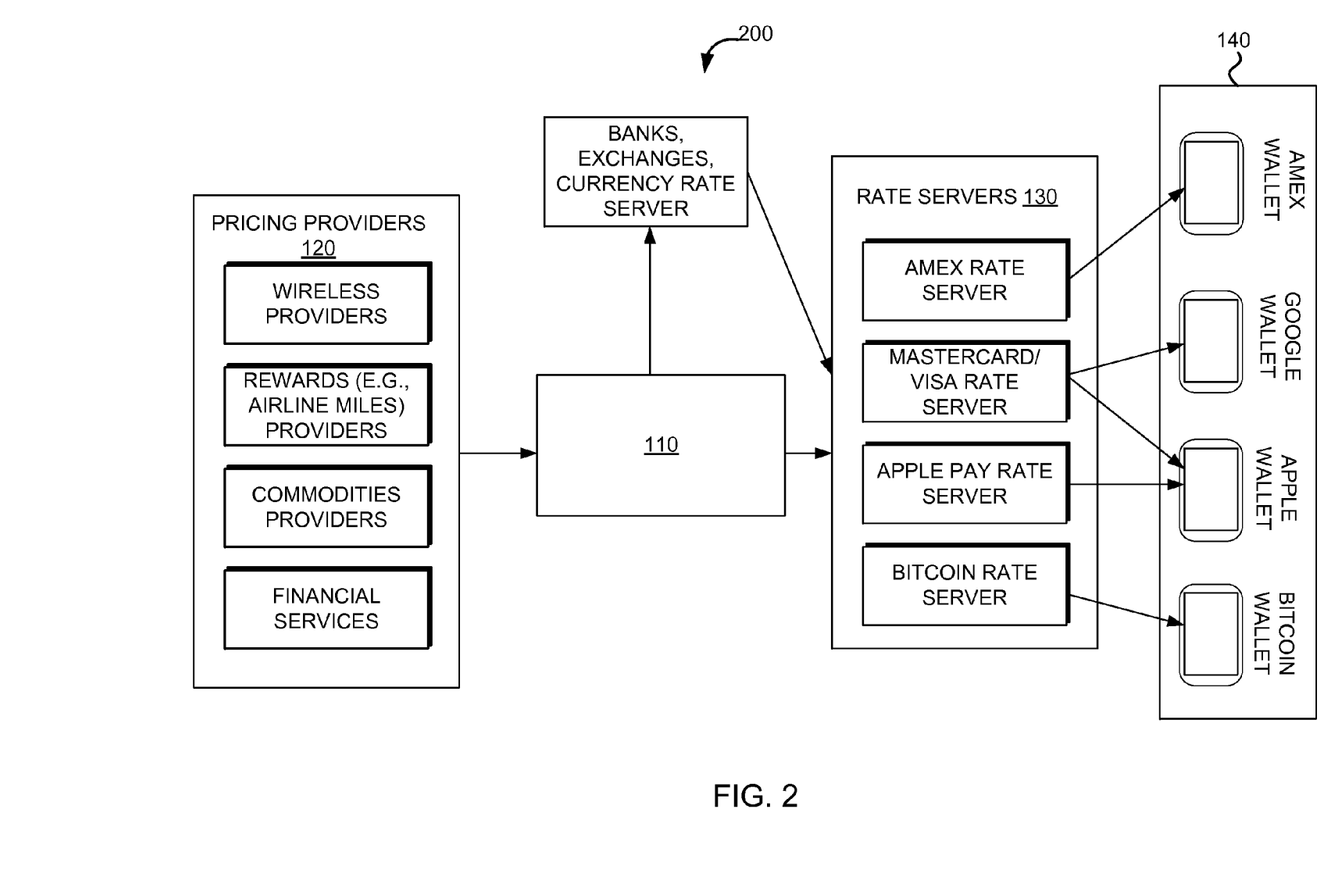
FIG. 2 illustrates an exemplary data flow diagram for various components in a system for providing an exchange service that provides price information for wireless communication units and other commodities and facilitating the purchase through wallet applications, according to an implementation of the invention.

FIG. 2 illustrates an exemplary data flow diagram 200 for various components in a system for providing an exchange service that provides price information for wireless communication units and other commodities and facilitating the purchase through wallet applications, according to an implementation of the invention.

Various pricing providers 120 may provide pricing information to computer system 110. For example, telecommunications providers (e.g., satellite phone providers, cellular phone providers, etc.) may provide pricing information for wireless communication units. Rewards providers (e.g., an airline miles provider) may provide exchange rates for rewards (e.g., to exchange airline miles to currency and vice versa), a commodity exchange or provide may provide pricing for commodities, financial services markets or companies may provide prices for mutual funds, stocks, or other financial instruments. Others that provide goods or services at a price or exchange rate that generally (although not necessarily) varies may also provide price information to computer system 110 as well.

Computer system 110 may obtain the pricing information and store the pricing information in association with its source and the commodity to which the pricing information pertains. In this manner pricing information for wireless minutes may be provided alone or along with other types of commodities using a digital currency and/or other type of currency.

Computer system 110 may provide the pricing information to various entities, such as rate servers 130. In this manner, rate servers 130 may incorporate the pricing information into their own rate services they provide to downstream recipients. Some rate servers 130 may provide its rates to other rate servers. For example, a centralize bank or currency exchange may provide exchange rates (including pricing information from computer system 110) to other rate servers, which may be associated with individual companies involved in electronic payment systems, some of which may be proprietary and some of which may use a digital currency such as Bitcoin.

In turn, each rate server 130 may provide exchange rates (including the pricing information from computer system 110) to its downstream recipients, typically (although not necessarily) to wallet applications 146, executing on client devices 140, that cooperate with the corresponding rate server. A wallet application 146 may display the exchange rates/pricing information and facilitate the purchase of wireless minutes natively using a payment account associated with the wallet application.

Having described a high level overview of the system, attention will now be turned to the functions of computer system 110, which may be programmed by exchange application 116.

Exchange Application 116

Figure 3:
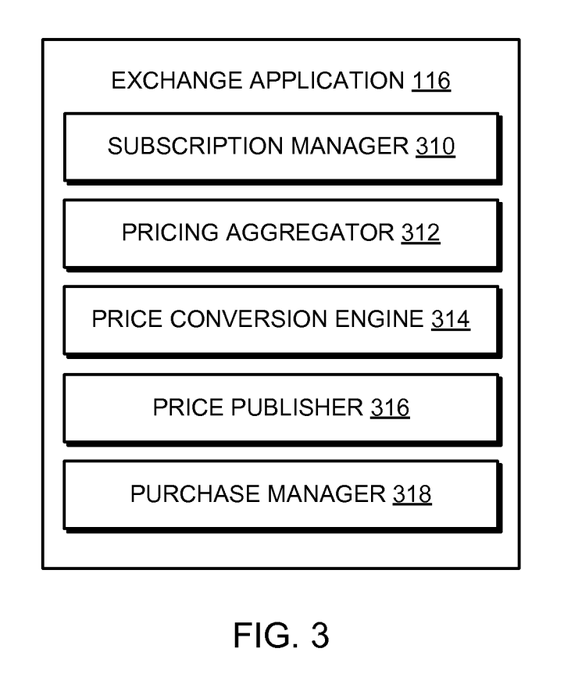
FIG. 3 illustrates an exemplary exchange application for an exchange service that provides price information for wireless communication units and other commodities, according to an implementation of the invention.

FIG. 3 illustrates an exemplary exchange application 116 for an exchange service that provides price information for wireless communication units and other commodities, according to an implementation of the invention.

Exchange application 116 may include instructions that program computer system 110. The instructions may include, without limitation, a subscription manager 310, a price aggregator 312, a price conversion engine 314, a price publisher 316, a purchase manager 318, and/or other instructions that program computer system 110 to perform various operations, examples of which are described in greater detail herein. As used herein, for convenience, the various instructions will be described as performing an operation, when, in fact, the various instructions program the processors 112 (and therefore computer system 110) to perform the operation.

Subscription Manager 310

According to an aspect of the invention, subscription manager 310 may register a subscription user to receive price information for wireless communication units. As used herein, the term "subscription user" may refer to an entity such as rate server 130, a person, a wallet application, and/or others that register to receive price information provided by computer system 110. For instance, an entity such as a rate server 130 may be interested in obtaining the price information and providing such price information along with other prices provided by that rate server. An individual person may subscribe to receive the price information as well. Likewise, an application (e.g., a wallet application 144) may subscribe to directly receive the price information (rather than or in addition to receiving such pricing from a rate server 130).

Upon registration, subscription information related to the subscription user may be collected and stored in a subscription database, such as in one or more databases 160. The subscription information may include subscription user identification information, authentication information (e.g., a secret such as a password), currency preference information that indicates a preferred currency in which denominate prices, commodity preference information that identify commodities for which price information is desired, and/or other information related to the subscription user.

Pricing Aggregator 312

According to an aspect of the invention, pricing aggregator 312 may obtain price information from one or more pricing providers 120. For instance, pricing aggregator 312 may obtain a price of wireless minutes offered by a wireless service provider, a commodity price from a commodities exchange, a security price from a securities exchange, and/or other price information. Pricing aggregator 312 may obtain such price information on-demand, at regular intervals, and/or at other times. Furthermore, pricing aggregator 312 may request (e.g., pull) the price information and/or be provided with (e.g., pushed) the price information. The price information may be stored in a pricing database, such as a database 160 for later retrieval and/or historical price analysis.

The pricing database may further store an association of a given SIM card identifier with a wireless service provider that provides wireless service and/or with a price for wireless minutes. In this manner, a given SIM card may be mapped to a price for wireless minutes.

In some instances, the price information may specify a price that varies. For example, the price of wireless minutes may vary due to promotions offered by a wireless service provider, time of day, day of week, location (e.g., whether in-network), service load, and/or other factor that may cause the price to vary. In this manner, a wireless service provider may advantageously use the system to provide real-time price information for its services and facilitate the sale of such services to end users (e.g., those who use wireless communication units). Likewise, other entities may advantageously use the system to provide real-time price information for its commodities and facilitate the sale or exchange of such commodities.

The price information may be associated with identification information that indicates the relevant commodity so that the price information may be later matched with the relevant commodity. For instance, price information for a wireless minute may be associated with identification information such as an identity of a wireless service provider, a Subscriber Identity Module (SIM) or other mobile account identity, and/or other identifying information. In this manner, price information may be matched to a given type of service provider or a given commodity to facilitate the sale of such commodity.

In implementations in which price information relates to wireless minutes (or other wireless communication unit), the system allows variable pricing for wireless minutes, even on prepaid devices such as prepaid SIM cards, prepaid phones, etc. For instance, a SIM card that has been sold or is offered for sale at a retail outlet may be associated with a variable price for wireless minutes. In other words, instead of a set number of wireless minutes for a prepaid SIM card or phone, for example, the price may vary according to real-time pricing offered by the wireless service provider that provides service to the SIM card or phone.

In an implementation, the price of a commodity may vary as a result of a promotion or sale. For instance, a wireless service provider may offer a promotion during a specified period of time that may begin at a starting point in time (e.g., date and/or time) and ends at an ending point in time (e.g., date and/or time). During the promotion, the price per minute may be reduced. The system may publish the appropriate price information based on the promotion so that end users who are interested in activating or reloading a SIM card or prepaid phone, for instance, may obtain real-time pricing that reflects any promotion (as well any other price variation).

Price Conversion Engine 314

According to an aspect of the invention, price conversion engine 314 may convert the price of wireless minutes from one currency to one or more other currencies. For instance, if wireless service provider provides the price of wireless minutes in a first currency, price conversion engine 314 may convert the price of wireless minutes to a second currency and/or third currency. Such conversion may be performed based on current exchange rates (between the first, second, and/or third currencies) provided by one or more rate servers 130.

Price Publisher 316

According to an aspect of the invention, price publisher 316 may provide price information for wireless minutes and/or other commodities in one or more currencies. As would be appreciated, the one or more currencies may each be converted by to another currency by the recipient (e.g., a subscription user).

Price publisher 316 may provide the price information to subscriber users or others based on an occurrence of a publication trigger event and/or an on-demand request. Typically, though not necessarily, the subscriber users or others may cache the price information for local retrieval, as will be described below with respect to wallet application 146.

Broadcasting Price Information

In some instances, price publisher 316 may provide price information through a broadcast message that is pushed to subscriber users or others. The broadcast message may be responsive to an occurrence of a publication trigger event. A publication trigger event may include, without limitation, a change in the price information (as measured from previously obtained price information for a given commodity), a passage of a predefined and/or configurable amount of time, and/or other event that causes price publisher 316 to provide price information to subscriber users or others.

Upon occurrence of a publication trigger event, price publisher 316 may identify relevant subscriber users and their subscriptions. Price publisher 316 may then provide the appropriate price information to the subscriber users or others.

Such publication may be made through, for example, a multicast communication, a one-to-one communication, a webservice (e.g., a Simple Object Access Protocol (SOAP) service), and/or other communication protocol in which a sender may push information to a recipient.

On-Demand Price Information

In some instances, price publisher 316 may provide price information responsive to a request. For instance, price publisher 316 may expose an Application Programming Interface (API), a webservice (e.g., a SOAP service), and/or other interface through which a computing device (e.g., a computing device of a rate server 130, an individual, an application, etc.) is provided with the price information. In some instances, a user interface application (such as an application executing through an Internet browser) may use the interface to request and obtain the price information from price publisher. The user interface application may display the price information through, for example, a website, a mobile application, and/or other user interface suitable to display or otherwise consume the price information.

In some instances, price publisher 316 may provide a price for a commodity responsive to a request that is specific for the commodity. For example, a client device 140 may request a current price for wireless minutes for use in a wireless service. In a particular example, a client device may scan or otherwise obtain identification information packaged with, or directly printed onto, SIM cards, pre-paid phones, and/or other devices used to access a wireless service. Client device 140 may provide the identification information to price publisher 316.

Upon receipt of the identification information, price publisher 316 may identify the corresponding type of commodity (e.g., wireless service) and/or provider (e.g., wireless service provider) based on the identification information. Price publisher 316 may obtain and provide the appropriate price for wireless minutes based on the identified wireless service and/or provider. In some instances, a first SIM card may be encoded with first identification information while a second SIM card may be encoded with second identification information. The first identification information may correspond to a first price for wireless minutes, while the second identification information may correspond to a second price (different than the first price) for wireless minutes. In this manner, different SIM cards (or other devices) may be associated with different pricing structures. Furthermore, as would be appreciated, different SIM cards may be associated with different wireless service providers (and therefore may have different pricing structures for their wireless minutes).

Customizing the Price Information

In an implementation, price publisher 316 may provide a price for wireless minutes based on an identity of a wallet application to which the price is provided. For example, the price for wireless minutes may be provided in a digital currency (e.g., Bitcoin) for a digital currency wallet or a fiat currency for a fiat currency-based wallet. In this manner, price publisher 316 may provide a given wallet application 146 with a price for wireless minutes using the currency preferred or otherwise used by the wallet application. Conversion to and from different currencies may be performed by price conversion engine 314. In other implementations, price publisher 316 may provide a given wallet application (or all wallet applications) with price information that includes prices denominated in a predefined currency, which may then be converted to an appropriate currency by each respective wallet application.

In an implementation, the price (or other information) may be customized based on an identity of a user of a wallet application. For instance, price publisher 316 may obtain an identity of a user associated with the wallet application, such as from registration information obtained during a registration process described herein. Price publisher may customize the actual price or offer for wireless minutes (or other commodity) based on the identity of the user. For example, price publisher 316 may obtain user preferences, prior user activity (e.g., previously purchased wireless minutes or other commodity, wireless usage activity, etc.), user demographic information, and/or other information known about the user to provide customized price or other information.

Localizing the Price Information

In an implementation, price publisher 316 may provide a price for wireless minutes using a currency localized for wallet application 146. For instance, a client device 140 executing wallet application 146 may provide location information (e.g., Global Positioning System information, manual input by an end user, etc.) that indicates a location of the client device. The location information may be received in association with a request from wallet application 146 to receive the price for wireless minutes and/or may be received periodically from the wallet application. Price publisher 316 may use the location information to automatically localize the price for wireless minutes. For example, price publisher 316 may identify a currency accepted at the location and may localize the price of wireless minutes according to the local currency.

Purchase Manager 318

According to an aspect of the invention, purchase manager 318 may facilitate purchase of a commodity (e.g., wireless minutes). For example, purchase manager 318 may receive a payment, initiated by wallet application 146, for wireless minutes. Upon receipt of the payment, purchase manager 318 may arrange for the provision of the purchased commodity. For example, purchase manager 318 may cause a SIM card account to be activated or reloaded with an appropriate number of purchased wireless minutes. Other types of commodities may be arranged for provision as well. Payments may be processed by purchase manager 318 or purchase agent 316, and will be described below with respect to purchase agent 416.

Wallet Application 146

Figure 4:
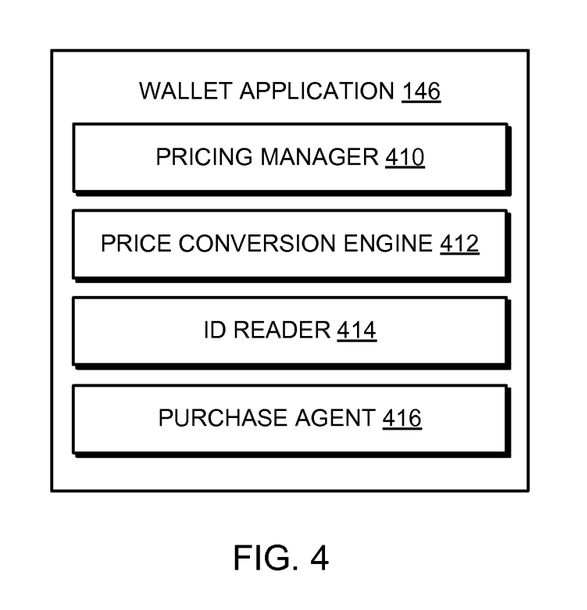
FIG. 4 illustrates an exemplary wallet application for facilitating the purchase of wireless communication units and other commodities, according to an implementation of the invention.

FIG. 4 illustrates an exemplary wallet application for facilitating the purchase of wireless communication units and other commodities, according to an implementation of the invention. Wallet application 146 may include instructions that program client device 140. The instructions may include, without limitation, a pricing manager 410, a price conversion engine 412, an identification ("ID") reader 414, a purchase agent 416, and/or other instructions that program client device 140 to perform various operations, examples of which are described in greater detail herein. As used herein, for convenience, the various instructions will be described as performing an operation, when, in fact, the various instructions program the processors 142 (and therefore client device 140) to perform the operation.

Pricing Manager 410

According to an aspect of the invention, pricing manager 410 may obtain price information for wireless minutes. For example, pricing manager 410 may receive the price information from price publisher 416 upon the occurrence of a publication triggering event. Alternatively or additionally, pricing manager 410 may request the price information on-demand through an interface (e.g., API, web service, etc.) provided by pricing manager 410. Such on-demand requests may be initiated by the end user or by pricing manager 410 when a network connection is available and/or whenever wallet application 416 is opened.

In some instances, pricing manager 410 may obtain exchange rates for digital, fiat, and/or other types of currencies from exchange servers 130. The exchange rates may be used for conversion from one currency to another. Pricing manager 410 may maintain exchange rates for a particular currency for conversion to one or more other currencies. The particular currency may be used specifically by wallet application 146. For example, pricing manager 410, when part of a digital currency wallet application, may maintain exchange rates to convert Bitcoins to other currencies such as other digital currencies and/or fiat currencies.

Pricing manager 410 may cause the obtained price information and/or exchange rates to be stored in a memory, such as storage device 144. In some instances, the price information may be stored in a local price database at storage device 144.

Figure 8:
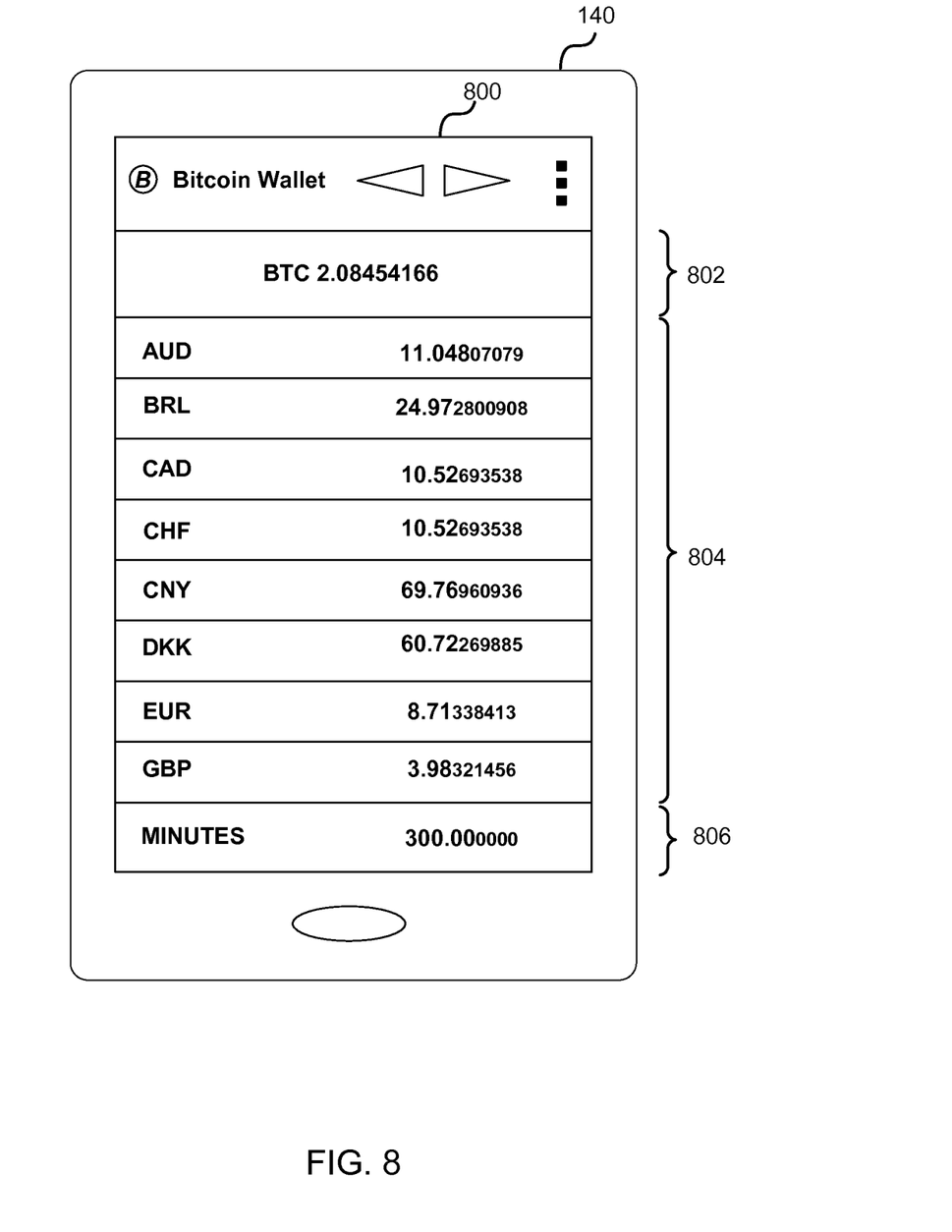
FIG. 8 depicts an exchange rate interface, according to an implementation of the invention.

Pricing manager 410 may provide the price information and/or the exchange rates via a user interface associated with wallet application 146. An example of such a user interface is illustrated in FIG. 8.

Price Conversion Engine 412

According to an aspect of the invention, price conversion engine 412 may convert the price of wireless minutes from one currency to another currency and, more generally, convert a given currency to another currency using the exchange rates. In this manner, currency exchange rates may be performed locally.

ID Reader 414

According to an aspect of the invention, ID reader 414 may read or otherwise obtain identification information associated with a SIM card, prepaid phone, and/or other device used to access wireless services. The identification information may: (i) be encoded using a machine readable code (e.g., a Quick Response (QR) code, a barcode, etc.), (ii) include alphanumeric text, (iii) be encoded using an electronic tag (e.g., a Radio Frequency Identification (RFID), Near Field Communication (NFC), etc.), and/or include other methods of conveying the identification information.

The identification information may be included (e.g., printed) on the SIM card (or other device) used to access wireless services and/or on packaging for the SIM card. In this manner, an end user may use client device 140 to obtain the identification information from the SIM card and/or packaging. For example, an end user may scan or otherwise read the identification information from the device and/or packaging using client device 140 (programmed by a wallet application 146).

Figure 7A:
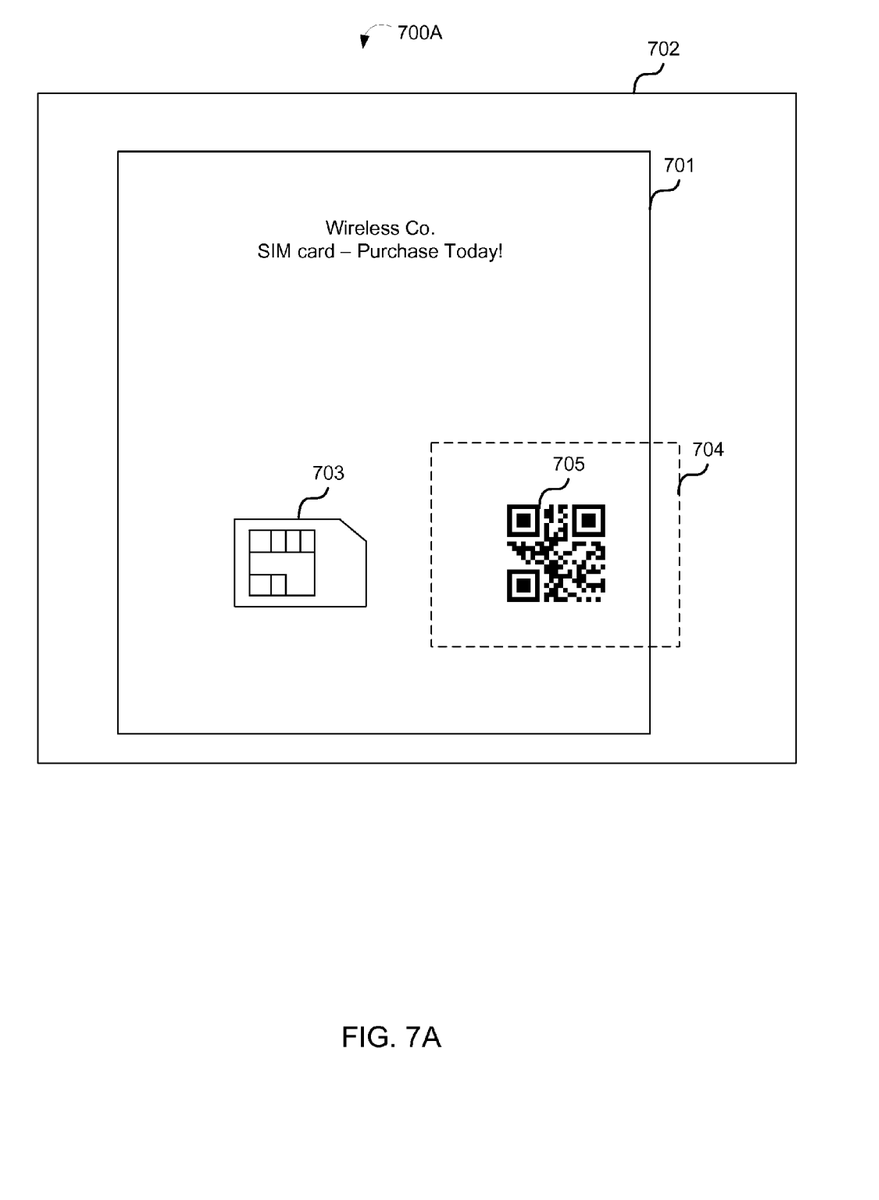
FIG. 7A depicts an identification acquisition interface, according to an implementation of the invention.

In an implementation, to obtain the identification information, ID reader 414 may cause an ID acquisition interface to be displayed by client device 140, such as the ID acquisition interface illustrated in FIG. 7.

Purchase Agent 416

According to an aspect of the invention, purchase agent 416 may facilitate the purchase of wireless minutes (or other commodity). For instance, purchase agent 416 may use ID reader 414 to obtain identification information associated with a SIM card. Once obtained, purchase agent 416 may match the identification information with a price information of corresponding wireless minutes or other commodity, which may be stored in storage device 144. Alternatively or additionally, purchase agent 416 may transmit, to computer system 110, a request to obtain real-time price information of wireless minutes associated with the SIM card. The request may include the identification information. Whether or not the price information agent 416 is obtained from local storage or in real-time, purchase agent 416 may provide the price information through a display to the end user, either in response to the obtained identification information or as an exchange rate display (illustrated in FIG. 8).

Upon receipt of an indication to purchase wireless minutes, purchase agent 416 may initiate payment processing using a payment account associated with wallet application 146. In implementations where wallet application 146 is associated with multiple payment accounts, purchase agent 416 may prompt the end user to select a given payment account.

Purchase agent 416 may process the payment based on the selected (or default/only) payment account. For example, purchase agent 416 may transmit payment identifying information (e.g., information associated with, though not necessarily including a credit card number) to a payment processor (which may process payments on behalf of the payee, such as a wireless service provider) according to conventional payment processing techniques. In another example, purchase agent 416 may provide a Bitcoin payer address, Bitcoin payee address, information signed using a Bitcoin private key, amount (as determined from the wireless minutes price and applicable exchange rate) and, and/or other information required to process Bitcoin transactions.

In this manner, purchase agent 416 facilitates the purchase of wireless minutes (which may be variably priced) and other commodities using an integrated solution that can include digital and other currencies.

It should be appreciated that at least some of the functions of exchange application 116 may be performed by wallet application 146 and vice versa. For example, wallet application 146 may customize and/or localize the price information received directly from computer system 110 or from a rate server 130.

Figure 5:
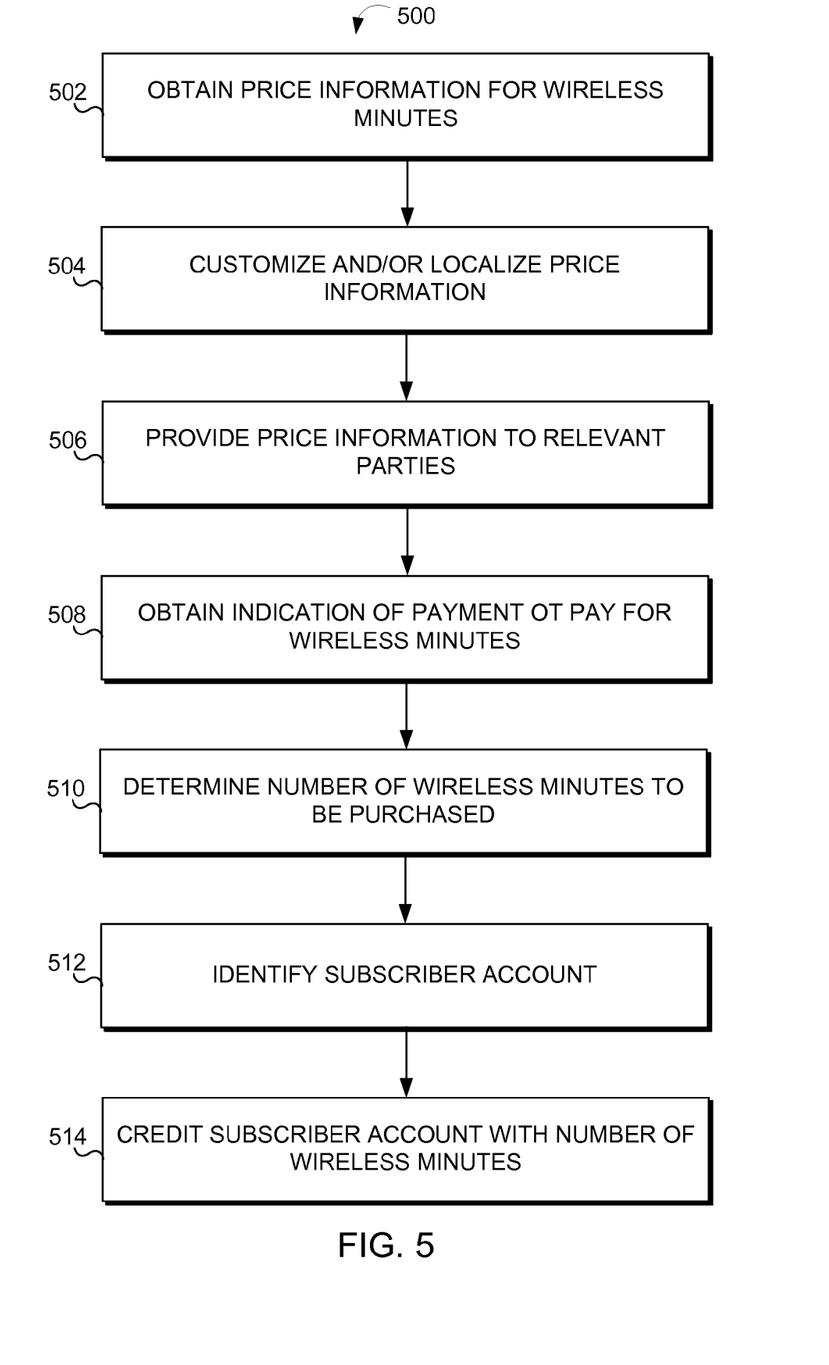
FIG. 5 illustrates a process of providing price information for wireless communication units and other commodities, according to an implementation of the invention.

FIG. 5 depicts a process 500 of providing an exchange service that provides price information for wireless communication units and other commodities, according to an implementation of the invention. The various processing operations and/or data flows depicted in FIG. 5 (and in the other drawing figures) are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

In an operation 502, price information for wireless minutes may be obtained. The price information may indicate a price for a given number of wireless minutes (or other wireless communication unit), an identification of a provider of the wireless minutes, and/or other information.

In an operation 504, the price information may be customized and/or localized. The price information, customized price information, and/or localized price information may be stored in a pricing database.

In an operation 506, the price information may be provided to relevant parties, which may include subscription users who have subscribed to receive the price information, users who have requested such price information on-demand, and/or others.

In an operation 508, an indication of a payment to pay for wireless minutes may be received.

In an operation 510, a number of wireless minutes involved in the purchase may be determined. For instance, the indication of the payment may include an indication of the amount paid (whether in digital, fiat, and/or other currency), an indication of the number of wireless minutes purchased, and/or other information that allows for a determination of the number or amount of wireless communication units that were purchased. If the payment indicates an amount paid, an appropriate number of wireless minutes may be determined based on pricing information (which may be stored in the pricing database).

In an operation 512, a subscriber account associated with the payment may be identified. For example, the indication of payment may be associated with identification information that identifies a SIM card.

In an operation 514, the subscriber account associated with the SIM card may be incremented by the number of minutes.

Figure 6:
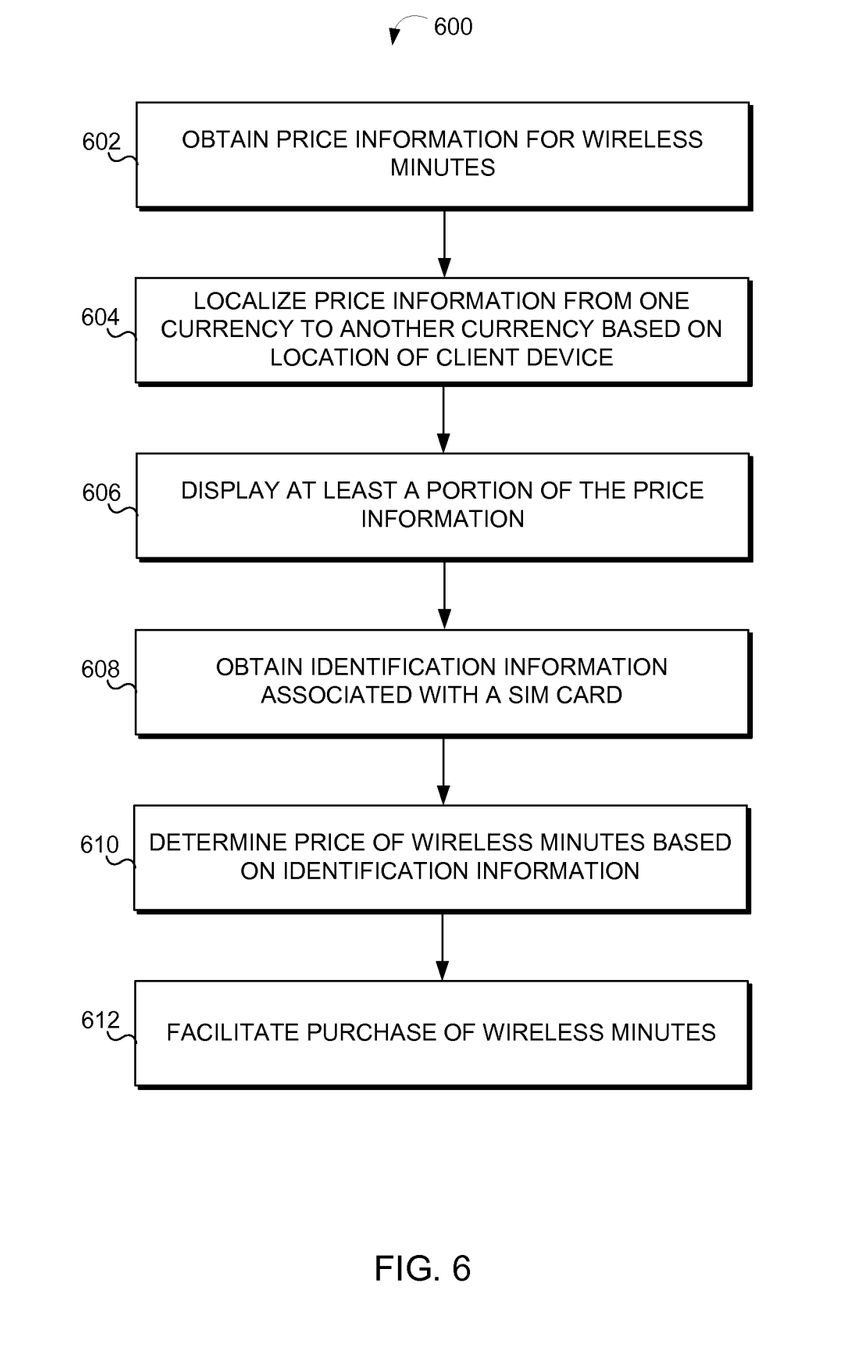
FIG. 6 depicts a process of facilitating the purchase of wireless communication units and other commodities, according to an implementation of the invention.

FIG. 6 depicts a process 600 of facilitating the purchase of wireless communication units and other commodities, according to an implementation of the invention.

In an operation 602, pricing or other information for wireless minutes may be obtained. The pricing or other information may include a price for one or more wireless minutes.

In an operation 604, the price may be localized by converting the price from one currency to another currency. In some instances, this operation may be unnecessary because the price may be obtained in an appropriate currency. In a particular implementation, the price may be denominated in Bitcoin currency, suitable for use with a Bitcoin wallet application, although other currencies and wallet applications may be used as well.

In an operation 606, at least a portion of the pricing information (e.g., the price) may be displayed. In some instances, the price may be displayed in one or more currencies. In some instances, the price may be displayed along with exchange rates for various digital, fiat, and/or other currencies. In this manner, an end user may be provided with a real-time (e.g., on-demand) or near real-time (e.g., regularly updated based on a triggering event) price for wireless minutes.

In an operation 608, identification information may be obtained from a SIM card, a prepaid phone, and/or other device used to access wireless services. Alternatively or additionally, the identification information may be read from packaging associated with such device, other media (e.g., a printed or electronic advertisement). In any event, the identification information may be encoded as a machine readable code (e.g., a QR code, a barcode, etc.). The machine readable code may be imaged using an imaging device (e.g., a camera) and image-processed using conventional techniques to obtain the identification information. The identification information may be manually input by an end user as well or be read from electronic tags (e.g., RFID, NFC, etc.). Other methods of obtaining the identification information will be apparent as well.

In an operation 610, a price of wireless minutes may be identified based on the identification information. For example, the identification information may be transmitted to a computer system, which responds with the price of the wireless minutes and/or an identification of the wireless service associated with the identification information. In some instances, the identification information may be used to locally look up the price for wireless minutes. For example, the identification information may be locally associated with a particular wireless service provider and/or a particular wireless service, which may (in turn) be associated with the price of wireless minutes.

In an operation 612, a purchase of wireless minutes may be facilitated. For instance, a payment account may be used to purchase the wireless minutes. Such purchase may use a particular currency, such as a Bitcoin or other currency. Information identifying the payment account (which may include an actual account identifier such as a credit card number or a token representative of the credit card number) may be pre-stored locally and/or may be input by the end user.

FIG. 7A depicts an ID acquisition interface 700A, according to an implementation of the invention. ID acquisition interface 700 (referred to hereinafter as "interface 700A") may include a field of view 702 and an imaging guide 704. Field of view 702 displays the range of a camera used for imaging, as described herein.

As illustrated in FIG. 7A, packaging 701 is within a field of view 702. Packaging 701 may package a SIM card 703 and include a printed QR code 705. The end user (e.g., a user operating client device 140 programmed with wallet application 146) is directed to arrange imaging guide 704 around QR code 705. In some instances, interface 700A may provide a visual indication that indicates whether or not the QR code 705 is properly aligned with imaging guide 704. Once the user takes an image of QR code 705, wallet application 146 may obtain identification information encoded thereon, as described herein. The identification information may be used to identify a wireless service (or commodity as described herein) and/or a wireless service provider (or commodity provider).

In some instances, wallet application 146 may have stored an association of pricing information and the wireless service and/or wireless service provider. In this instance, the end user may be made aware of the current price for minutes. Alternatively or additional, wallet application 146 may obtain a real-time price quote for the wireless minutes by transmitting the identification information to computer system 110. The end user may purchase wireless minutes based on the obtained identification information.

Figure 7B:
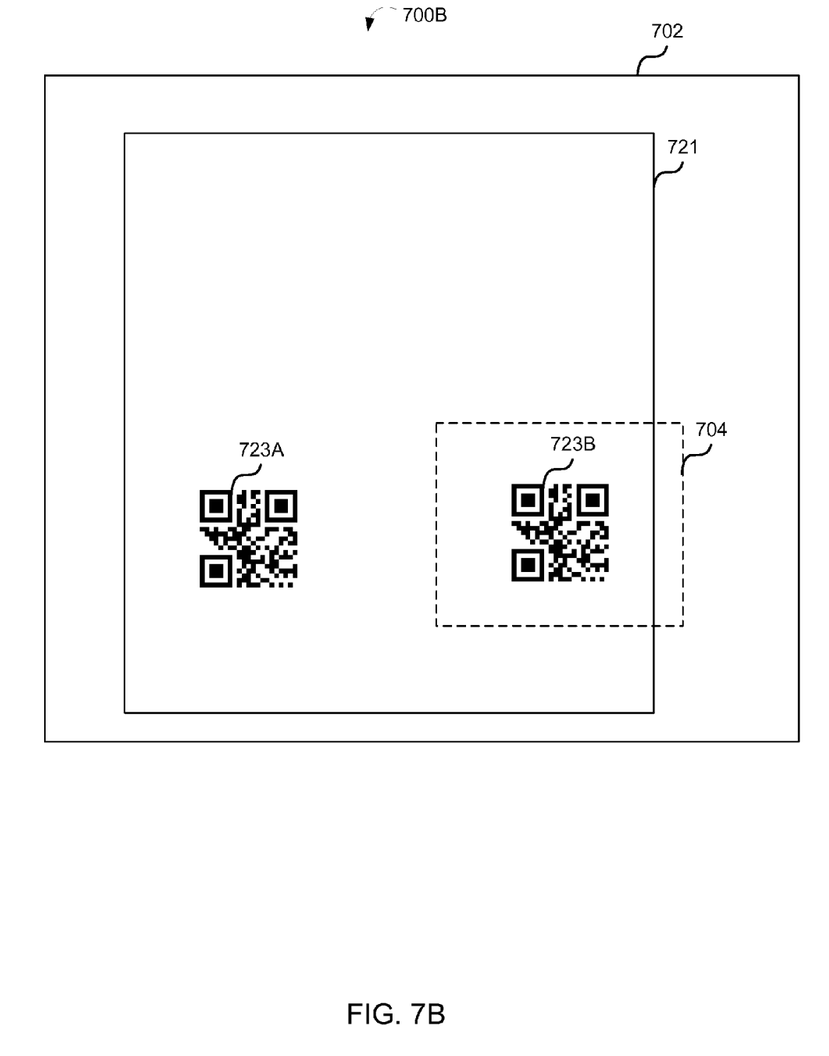
FIG. 7B depicts an identification acquisition interface, according to an implementation of the invention.

FIG. 7B depicts an ID acquisition interface 700B, according to an implementation of the invention. ID acquisition interface 700 (referred to hereinafter as "interface 700B") may include similar features and functions as those described with respect to interface 700A. However, FIG. 7B illustrates content 721 (e.g., a magazine or other content, which may be printed or electronic) that includes one or more QR codes 723 (illustrated as QR codes 723A, 723B) each corresponding to a different commodity, such as a mutual fund or financial security. As would be appreciated, other machine readable codes, alphanumeric text (e.g., for manual input by the end user), and/or other markings may be used as well. Upon obtaining identification information associated with a given QR code 723, the end user may be provided with a corresponding current price (e.g., a current mutual fund price or financial security price). The end user may be provided with an opportunity to purchase the mutual fund or financial security using a payment account associated the wallet application. Of course, such functionality may also be incorporated into a branded mobile application for a stock broker or other financial services firm that allows users to purchase mutual funds or financial securities. Furthermore, other types of commodities may likewise be advertised for sale.

FIG. 8 depicts an exchange rate interface 800, according to an implementation of the invention. Exchange rate interface 800 (hereinafter, "interface 800") may display a currency used by wallet application 146. As illustrated, for example, wallet application 146 uses Bitcoins for payments. Section 802 indicates that the current balance of Bitcoins is 2.08454166. Section 804 includes other currencies and their equivalent values based on prevailing exchange rates (as obtained by wallet application 146). Section 806 indicates a number of wireless minutes that may be purchased, according to the current price of wireless minutes from a given wireless service provider and based on prevailing exchange rates (assuming that the wireless minutes were not priced using Bitcoins). As would be appreciated, Sections 802, 804, and 806 are used for illustrative purposes only. Interface 800 may not necessarily be sectioned off or may have other sections not illustrated.

Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A computer implemented method of providing price information for wireless communication units, the method being implemented in a computer system having one or more physical processors programmed with computer program instructions that, when executed by the one or more physical processors, cause the computer system to perform the method, the method comprising:
   obtaining, by the computer system, from a pricing provider, price information for a wireless communication unit that represents an increment of usage of a wireless service;
   identifying, by the computer system, a rate server that is subscribed to receive the price information;
   causing, by the computer system, the price information for the wireless communication unit to be transmitted to a wallet application of a client device via the rate server;
   causing, by the computer system, at least a portion of the price information to be displayed on the client device;
   receiving, by the computer system, a payment related to a purchase of one or more wireless communication units, the payment originating from the wallet application for facilitating payment through at least one payment processor;
   identifying, by the computer system, a subscriber account related to the payment;
   causing, by the computer system, the subscriber account to be updated based on the one or more wireless communication units;
   obtaining, by the computer system, second price information for a commodity other than wireless communication units;
   obtaining, by the computer system, third price information for a reward;
   identifying, by the computer system, a second rate server subscribed to receive at least some price information from the computer system;
   identifying, by the computer system, whether the second rate server is subscribed to receive the price information for the wireless communication units, the second price information for the commodity other than wireless communication units, or the third price information for the reward; and
   causing, by computer system, the price information for the wireless communication units, the second price information for the commodity other than wireless communication units, or the third price information for the reward to be transmitted to a second wallet application via the second rate server.

2. The method of claim 1, wherein the wireless communication units comprises a unit of time.

3. The method of claim 1, wherein the wireless communication units comprises a unit of data download or upload.

4. The method of claim 1, wherein the price information comprises a price of the wireless communication unit denominated in a first currency, the method further comprising:
   identifying, by the computer system, a second currency used by the rate server;
   determining, by the computer system, whether the first currency is the same as the second currency; and
   converting, by the computer system, the price of the wireless communication unit from the first currency to the second currency responsive to a determination that the first currency is different from the second currency.

5. The method of claim 4, wherein converting the price of the wireless communication unit comprises converting the price from the first currency to Bitcoin currency.

6. The method of claim 5, wherein the payment is made using Bitcoin currency.

7. The method of claim 4, wherein converting the price of the wireless communication unit comprises converting the price from the first currency to a fiat currency.

8. The method of claim 7, wherein the payment is made using the fiat currency.

9. A system of providing price information for wireless communication units, the system comprising:
   a computer system comprising one or more physical processors programmed by computer program instructions that, when executed, cause the computer system to:
   obtain, from a pricing provider, price information for a wireless communication unit that represents an increment of usage of a wireless service;
   identify a rate server that is subscribed to receive the price information;
   cause the price information for the wireless communication unit to be transmitted to a wallet application of a client device via the rate server;
   cause at least a portion of the price information to be displayed on the client device;
   receive a payment related to a purchase of one or more wireless communication units, the payment originating from the wallet application for facilitating payment through at least one payment processor;
   identify a subscriber account related to the payment;
   cause the subscriber account to be updated based on the one or more wireless communication units
   obtain second price information for a commodity other than wireless communication units;
   obtain third price information for a reward;
   identify a second rate server subscribed to receive at least some price information from the computer system;
   identify whether the second rate server is subscribed to receive the price information for the wireless communication units, the second price information for the commodity other than wireless communication units, or the third price information for the reward; and
   cause the price information for the wireless communication units, the second price information for the commodity other than wireless communication units, or the third price information for the reward to be transmitted to a second wallet application via the second rate server.

10. The system of claim 9, wherein the wireless communication units comprises a unit of time.

11. The system of claim 9, wherein the wireless communication units comprises a unit of data download or upload.

12. The system of claim 9, wherein the price information comprises a price of the wireless communication unit denominated in a first currency, and wherein the computer system is further programmed to:

identify a second currency used by the rate server;

determine whether the first currency is the same as the second currency; and convert the price of the wireless communication unit from the first currency to the second currency responsive to a determination that the first currency is different from the second currency.

13. The system of claim 12, wherein to convert the price of the wireless communication unit, the computer system is further programmed to convert the price from the first currency to Bitcoin currency.

14. The system of claim 13, wherein the payment is made using Bitcoin currency.

15. The system of claim 12, wherein to convert the price of the wireless communication unit, the computer system is programmed to convert the price from the first currency to a fiat currency.

16. The system of claim 15, wherein the payment is made using the fiat currency.

* * * * *